Dec. 15, 1959 M. P. BAKER 2,917,334
BALL JOINT
Filed Nov. 13, 1956

INVENTOR.
MAX P. BAKER
BY
HIS ATTORNEY

United States Patent Office 2,917,334
Patented Dec. 15, 1959

2,917,334
BALL JOINT

Max P. Baker, Dayton, Ohio, assignor to General Motors Corporation, Detroit, Mich., a corporation of Delaware Application November 13, 1956, Serial No. 621,839

5 Claims. (Cl. 287—87)

This invention relates to universal type joints and in particular to ball and socket type joints.

One type of ball joint which is in wide-spread use, particularly in connection with automobile independent wheel suspensions, involves a metal socket member having a high impact synthetic resin liner secured to partially spherical internal surfaces thereof which snugly embraces, for relative movement, a spherical ball portion of a ball stud.

In automobile front wheel suspension assemblies one form of the ball joint involves a substantially vertical positioning of the ball stud with the top half of the ball being in snug engagement with the liner of the top half of the socket which during the operation of the suspension is subject primarily to vertical thrust and some lateral thrust. The lower half portion of the ball is loosely encased in a half shell having a central aperture therein through which the stud projects and which is secured to the top half shell. In another form, the ball is in snug engagement with a high impact synthetic resin liner secured to partially spherical internal surfaces of the lower half shell, which is subjected primarily to lateral thrust during the operation of the suspension. These ball joints have proven economical to manufacture since the socket portions may be made of case hardened metal stampings and the synthetic resin liners may be molded and bonded directly to the stamping to provide accurately dimensioned bearing surfaces for the ball. Moreover the ball joints have proven durable and capable of withstanding the rough usage incident to automobile suspension operation. However experience has shown that in ball joints wherein the ball is in snug engagement with the socket member over a substantial area thereof, particularly wherein the socket member includes a synthetic resin liner, there is a marked tendency for the ball to lock or bind with respect to the socket or synthetic resin liner under static conditions, even when the parts are adequately lubricated, requiring considerable torque to overcome the static resistance caused thereby and a resulting reduction in the efficiency of the operation of the ball joint.

Among the objects of this invention there is one to provide a more efficient ball joint of the character described above which eliminates the tendency of the ball to lock or bind with respect to a socket or a synthetic resin liner of the socket. This and other objects are carried out by providing a socket member which has internal spherical surfaces distorted or otherwise formed so that the ball is at all times in engagement therewith substantially only within a certain predetermined spherical zone thereof.

Further objects and advantages of the present invention will be apparent from the following description, reference being had to the accompanying drawings wherein preferred embodiments of the present invention are clearly shown.

Figure 1:
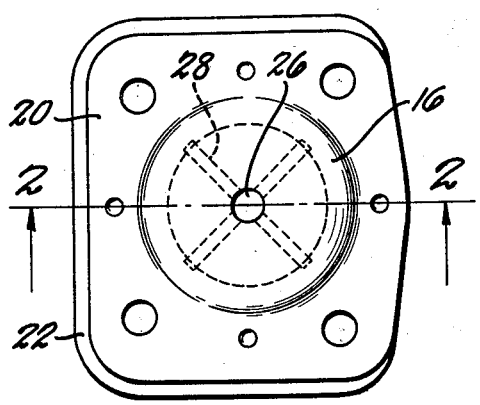
Figure 1 is a top view of a ball joint.
Figure 2:
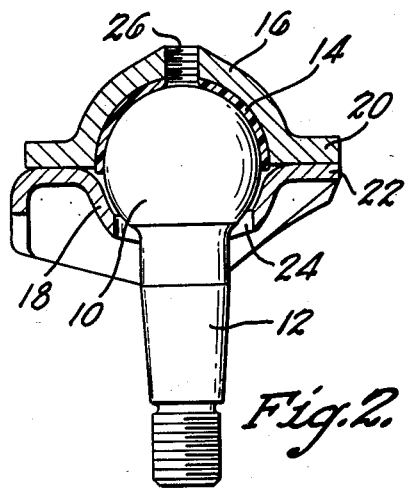
Figure 2 is a cross-sectional view of a ball joint taken along line 2—2 of Figure 1.

A ball joint of the character involved in the present invention is illustrated by Figures 1 and 2 of the drawings. It includes a forged spherical ball 10 having a stud 12 integrally attached thereto. The top half of the ball is encased in a high impact synthetic resin liner 14 which is bonded to and supported by a top half shell 16 of a socket assembly. The lower or stud half or portion of the ball is loosely encased in a lower half shell 18 of the socket assembly which is attached to the top half shell 16 by means of opposed flange portions 20 and 22 associated with half shells 16 and 18 respectively, welded or otherwise secured together. A centrally disposed aperture 24 in the lower half shell 18 is provided through which the stud 12 projects and is of sufficient size to permit the stud to oscillate a desired degree. Desirably the ball joint assembly includes an elastomeric seal (not shown) sealingly engaging the outer surfaces of the lower half shell 18 and the stud 12 to prevent the ingress of dirt and other deleterious substances into the joint through the opening 24. The upper half shell 16 of the socket assembly and liner 14 are provided with a centrally disposed threaded aperture 26 adapted to receive a lubrication fixture (not shown) and as shown by the dotted lines of Figure 1, the inner surfaces of the liner are provided with lubrication grooves 28 communicating with the lubrication opening 26. Preferably these grooves extend to the lower edge of the liner 14, dividing the liner half spherical shell into quadrants, to provide adequate lubrication between the ball and the liner. The liner 14 is preferably molded from a stack of phenol-formaldehyde impregnated fibrous layers or a fiber phenol-formaldehyde masticate. However, a wide variety of thermosetting resins well known in the art such as other phenol aldehyde resins, urea aldehyde resins and resins such as polyamides and superpolyamides may be used.

The ball joint assembly shown in Figure 2 is particularly designed for use in connection with an independent front wheel automobile suspension wherein the joint is mounted substantially in the position shown, and the socket assembly has imposed thereon approximately one-fourth of the weight of the car. In the course of the operation of the suspension the thrust on the ball joint assembly is primarily in a vertical direction although considerable lateral thrust is also imposed thereon.

Figure 3:
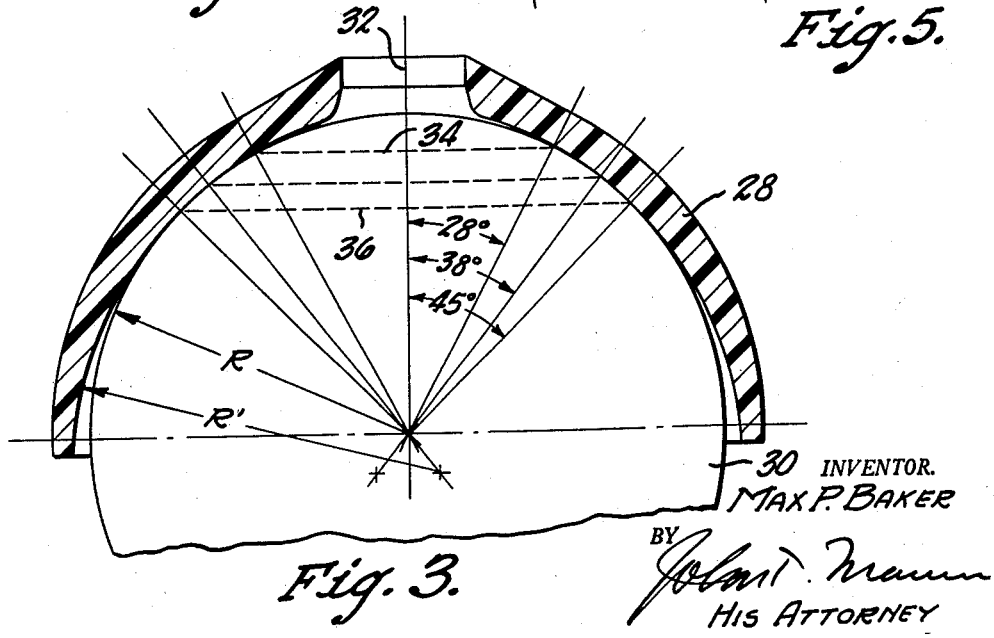
Figure 3 is a fragmentary ball portion associated with a distorted synthetic resin liner in accordance with the invention.

It has been found that in a ball joint of this type the ball tends to freeze, bind or lock with respect to the synthetic resin liner under static conditions even though thoroughly lubricated and considerable torque is required to break the ball free of the socket liner which effects adversely the efficiency of operation of the ball joint. In accordance with the present invention, the tendency of the ball to freeze with respect to the socket or socket liner is effectively eliminated by distorting the liner 28 as shown in Figure 3 so as to provide bearing contact between the ball 30 and liner 28 only within a certain predetermined spherical zone of the liner. This zone is illustrated in relation to Figure 3 wherein a polar diameter 32 of the liner 28 is indicated to be substantially in line with the primary thrust on the joint. The spherical zone bounded by circles 34 and 36 which may be defined as located by radii of the liner located between approximately 28° and 45° respectively, from the polar diameter 32 of the socket and being perpendicular thereto. It has been found that an optimum point of contact between the ball and the liner involving a minimum binding effect, within this zone, is on a circle located by radii of the liner extending approximately 38° from the polar diameter 32 of the socket and being perpendicular thereto, although contact of the ball and liner within the zone indicated above produces markedly beneficial results.

Figure 4:
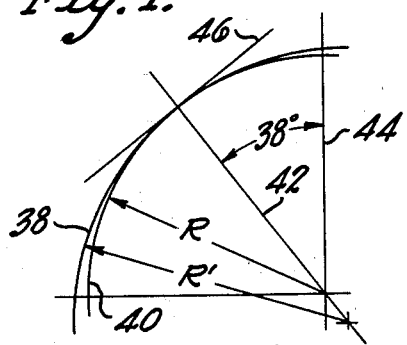
Figure 4 illustrates one method of generating a distorted synthetic resin liner surface in accordance with the invention.

One method of distorting the socket liner in accordance with the invention is shown in Figure 3 and Figure 4 wherein R represents the radius of the ball and R' represents a larger radius of the partially spherical inner surfaces of the liner. The arc 38 of a radius R' is positioned relative to arc 40 representing the curvature of the ball so that the two arcs touch or coincide at a point located by a radius 42 located for example 38° from the polar diameter 44 of the ball and a common tangent 46 may be drawn through the point of arc coincidence, and the liner arc 38 is revolved about the polar diameter 44 to form a distorted partially spherical liner which will receive a spherical ball having a radius R contacting the liner at a circle perpendicular to the polar diameter 44 located by radii located preferably 38° from the polar diameter of the socket liner. A male mold member may be made up having external surfaces corresponding to the above described socket surfaces for molding the liners, and similarly die members of corresponding contour may be used to make socket stampings such as 16 of Figure 2 to support the liners.

Figure 5:
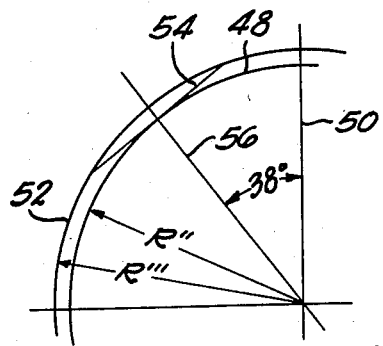
Figure 5 illustrates another method of generating a distorted synthetic resin liner surface in accordance with the invention.

Another method of distorting the socket liner in accordance with the present invention is shown in Figure 5. An arc 48 is drawn having a radius R" corresponding to the radius of the spherical ball which has a polar diameter 50. A second arc 52 is drawn having a larger radius R''' which has a common locus with the radius R". A tangent 54 is then drawn to the arc 48 at the point where the radius 56, located for example 38° from the polar diameters 50, intersects the arc 48. A liner is then formed having an inner surface generated by a revolution of the arc 52 and tangent line 54 as shown, about the polar diameter 50. The liner will contact a spherical ball having a radius R" substantially at a circle perpendicular to the polar diameter 50 on the frustro-conical surfaces generated by the tangent line 54, located by radii located 38° from the polar diameter 50 of the socket liner; or within a spherical zone about the contact circle.

As shown in Figure 1, the socket liner preferably includes lubricant grooves 28. With this construction, the zone of contact above referred to will of course extend between the grease grooves 28 to form a broken zone of contact.

Although the present invention has been described in terms of a distorted synthetic resin liner, it is also applicable to metal socket members wherein metal surfaces of the socket contact the spherical ball.

While the embodiments of the present invention as herein disclosed constitute preferred forms, it is to be understood that other forms might be adopted.

What is claimed is as follows:

1. In a ball joint assembly, a distorted partially spherical socket having a polar diameter, a spherical ball within said socket attached to a stud, said ball contacting said socket in a spherical zone thereof bounded by circles located by radii from about 28° to 45° respectively from said polar diameter.

2. In a ball joint assembly, a distorted partially spherical socket having a polar diameter, a spherical ball within said socket attached to a stud, said ball contacting said socket in a spherical zone thereof bounded by circles parallel to and substantially about a circle located by radii 38° from said polar diameter.

3. The ball joint assembly of claim 1 wherein said socket includes a liner that provides a distorted surface and is formed of a high impact synthetic resin secured to internal surfaces of said socket, said spherical ball being made of metal contacting said liner in said spherical zone.

4. The ball joint assembly of claim 2 wherein said socket includes a liner that provides a distorted surface and is formed of a phenolic resin secured to internal surfaces of said socket, said spherical ball being made of metal contacting said liner only within the predetermined spherical zone.

5. The ball joint assembly of claim 1 wherein said socket includes a liner that provides a distorted surface and is formed of a thermosetting resin secured to internal surfaces of said socket, said spherical ball being made of metal contacting said liner only within the predetermined spherical zone, the assembly being adapted to receive thrust primarily along said polar diameter.

References Cited in the file of this patent

UNITED STATES PATENTS

| | | |
|---|---|---|
| 1,653,352 | Faudi | Oct. 26, 1925 |
| 1,863,343 | Kuntle et al. | July 8, 1931 |
| 2,461,866 | Alldredge | Feb. 15, 1949 |
| 2,695,185 | Latzen | Aug. 15, 1950 |
| 2,752,178 | Hoffman | June 26, 1956 |